United States Patent
Sustic et al.

(10) Patent No.: US 9,695,342 B2
(45) Date of Patent: Jul. 4, 2017

(54) APAO HOT MELT ADHESIVES CONTAINING A LOW MOLECULAR WEIGHT, FUNCTIONALIZED, ISOTACTIC POLYPROPYLENE

(71) Applicant: REXtac LLC, Odessa, TX (US)

(72) Inventors: Andres Sustic, Odessa, TX (US); James Nicholas Fowler, Odessa, TX (US); Enrico L. Buenacosa, Odessa, TX (US); John J. DeCair, Odessa, TX (US)

(73) Assignee: REXtac LLC, Odessa, TX (US)

( * ) Notice: Subject to any disclaimer, the term of this patent is extended or adjusted under 35 U.S.C. 154(b) by 0 days.

(21) Appl. No.: 15/085,255

(22) Filed: Mar. 30, 2016

(65) Prior Publication Data

US 2016/0289511 A1 Oct. 6, 2016

Related U.S. Application Data

(60) Provisional application No. 62/140,813, filed on Mar. 31, 2015.

(51) Int. Cl.
*C08K 5/13* (2006.01)
*C09J 123/20* (2006.01)
*C09J 123/08* (2006.01)

(52) U.S. Cl.
CPC .......... *C09J 123/20* (2013.01); *C09J 123/08* (2013.01); *C08K 5/13* (2013.01)

(58) Field of Classification Search
CPC .......... C09J 123/20; C09J 123/14; C08K 5/13
USPC ........................................................ 524/323
See application file for complete search history.

(56) References Cited

U.S. PATENT DOCUMENTS

| 4,769,413 A * | 9/1988 | Fleming | C09D 161/06 524/507 |
| 2008/0233336 A1* | 9/2008 | Giannopoulos | D06N 7/0081 428/95 |

\* cited by examiner

*Primary Examiner* — Hui Chin
(74) *Attorney, Agent, or Firm* — Blank Rome LLP

(57) ABSTRACT

Adding a low molecular weight (or alternatively, high melt flow rate), functionalized, isotactic polypropylene (iPP) to a hot melt adhesive (HMA), composition containing a propylene-butene-1, and/or a propylene-ethylene amorphous poly alpha olefin (APAO) copolymer, in addition to other co-adjuvants (such as a tackifier or a plasticizer), results in an APAO-based HMA that shows improved tensile strength and bonding properties, over an HMA that contains only the propylene-butene-1 and/or the propylene-ethylene APAO copolymer (with or without a tackifier and/or a plasticizer).

4 Claims, No Drawings

APAO HOT MELT ADHESIVES CONTAINING A LOW MOLECULAR WEIGHT, FUNCTIONALIZED, ISOTACTIC POLYPROPYLENE

CROSS-REFERENCE TO RELATED APPLICATIONS

This application claims the benefit of U.S. Provisional Application No. 62/140,813 filed on Mar. 31, 2015, the contents of which are hereby incorporated by reference in their entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to amorphous poly-alpha-olefin (APAO) hot melt adhesives. More particularly, it relates to improving the performance of amorphous poly-alpha-olefin hot melt adhesives for use in all industrial adhesive applications including, but not limited to, assembly, construction, lamination, footwear and automotive components, by blending with a low molecular weight, functionalized, isotactic polypropylene.

2. Description of the Related Art Including Information Disclosed Under 37 CFR 1.97 and 1.98

U.S. Pat. No. 7,262,251 to Kanderski et al. describes a hot melt adhesive composition that is based on an isotactic polypropylene random copolymer. The composition contains about 4%-50% by weight of the random copolymer, about 20%-65% by weight of a compatible tackifier, about 0%-40% by weight of a plasticizer, about 0%-3% by weight of a stabilizer, about 0%-40% by weight of a wax, about 0%-60% by weight of an atactic poly-alpha-olefin (APAO), and about 0%-40% by weight of a secondary polymer.

U.S. Pat. No. 7,786,032 to Zhou et al. describes adhesive compositions comprising selected ratios of crystalline and amorphous polymers. In some versions, polymers capable of existing in different configurations (e.g., a polymer such as polypropylene which may exist in an atactic, syndiotactic, or isotactic configuration) are used to prepare adhesives. As an example, a selected amount of isotactic polypropylene is blended with a selected amount of atactic polypropylene to prepare an adhesive composition having one or more performance properties (e.g., bond strength) that are said to be superior to the performance properties of a conventional hot-melt adhesive.

U.S. Pat. No. 5,302,675, entitled "High Tensile Strength Amorphous 1-Butene/propylene Copolymers", describes a process for the production of high tensile strength 1-butene/propylene copolymers by reacting 1-butene and propylene monomers in the presence of a catalyst system comprising a) a solid supported catalyst component of the type commonly known as a Ziegler-Natta coordination polymerization catalyst, b) a trialkylaluminum cocatalyst component and c) and an organo alkoxy silane component commonly referred to in the polyolefins industry as an external electron donor, or external donor. The butene-1/propylene copolymers have substantially improved mechanical and rheological properties which make them desirable for use in such applications as hot melt adhesives, sealants, coatings and similar applications.

BRIEF SUMMARY OF THE INVENTION

Adding a low molecular weight (MW), or alternatively, high melt flow rate (MFR), functionalized, isotactic polypropylene (iPP) to a hot melt adhesive (HMA), composition containing a propylene-butene-1 (APB), and/or a propylene-ethylene (APE) amorphous poly alpha olefin (APAO) copolymer, in addition to other co-adjuvants such as a tackifier or a plasticizer, results in an APAO-based HMA that shows improved tensile strength and bonding properties, over an HMA that contains only the APB, and/or the APE copolymer (with or without a tackifier and/or a plasticizer) when used in such demanding applications as assembly, construction, lamination, footwear and automotive adhesives, to name a few. This low-MW, functionalized, iPP may be chosen so that its degree of crystallinity is several times larger than the degree of crystallinity of the APAO. The higher degree of crystallinity and higher MW of the functionalized iPP, provides the subject APAO(s) with a significant increase in mechanical and physical properties.

DETAILED DESCRIPTION OF THE INVENTION

The low-MW functionalized isotactic polypropylene, may have an ethylene content of up to 10 wt. %, more preferably 5 wt. %, most preferably less than 1 wt. %. Adding it to a hot melt adhesive composition containing a propylene-butene-1 (APB), and/or a propylene-ethylene (APE) amorphous poly alpha olefin (APAO) copolymer, in addition to other co-adjuvants such as a tackifier or a plasticizer, results in an APAO-based HMA that shows improved mechanical properties, such as higher tensile and bonding strength, over a HMA that contains only the APB and/or an APE copolymer (with or without a tackifier and/or a plasticizer) when used in such demanding applications as assembly, construction, footwear and automotive adhesives, to name a few. The APB and/or APE may be synthesized either in the absence of, or more preferably in the presence of, what are known as external donors of the organosilane type.

The low-MW functionalized isotactic polypropylene makes up at least 3 wt. %, preferably 5 wt. %, more preferably 10 wt. % and can be used as high as 15 wt. % of the blend. However, it is preferably added at 5 wt. %. This low-MW functionalized iPP may be chosen so that it has a degree of crystallinity, as reported by the heat of fusion, delta Hf, and measured by differential scanning calorimetry (DSC), several times larger than the heats of fusion of the propylene-butene-1, and/or a propylene-ethylene APAO. And, even though this low-MW functionalized iPP is denominated "low," its MW, as measured by such properties as melt viscosity (MV), or melt flow rate (MFR), or melt index (MI), may be several times larger than the MV of the subject APAOs whose melt viscosities measured at 190° C. (375° F.), are preferably higher than 15,000 cps, more preferably higher than 20,000 cps, most preferably higher than 50,000 cps but less than 100,000 cps. The higher degree of crystallinity and higher MW of the functionalized iPP, lends to the subject APAO(s) a significant increase in mechanical and physical properties. The degree of crystallinity may be measured by either differential scanning calorimetry (DSC) or by the fraction that is insoluble in boiling heptane, or heptane insoluble (HI).

In order to achieve desired performance, these low-MW iPPs may also be functionalized by any of the known chemistries using any of the methods and techniques known to those skilled in the art. The most common functionalization method is performed by the organic peroxide initiated reaction with maleic anhydride resulting in the grafting, or insertion of maleic anhydride moieties. This functionalization may be expected to impart to the iPP (and therefore to the total blend) improved adhesion properties to polar substrates, which the subject APAOs lack when used by themselves. The amount of grafted maleic anhydride moieties, as measured in units of hydrolysable acid groups, may be as high as 2.0 wt. %, but typically is about 1.0 wt. % Some commercial examples of these functionalized or maleated polypropylenes are POLYBOND® 3000, PB3200 and PB7200 [Chemtura Corporation, Middlebury, Conn. 06749].

The HMA subject of this invention is made up of a propylene-butene-1 APAO with a 1-butene content of about 20 wt. %, more preferably, about 35 wt. %, much more preferably about 50 wt. % and most preferably about 65 wt. %. As stated above, this APB may be made either in the absence of, or more preferably, in the presence of, an external donor. The ethylene-propylene APAO may have an ethylene content of at least 2 wt. %, more preferably 10 wt. %, most preferably 15% and as high as 20%.

There are other co-adjuvants, part of the subject HMA, such as tackifiers, preferably of the type that are considered compatible with the APAO components. Such tackifiers may be of the partially and fully hydrogenated C5, C5/C9 and hydrogenated dicyclopentadiene (DCPD) resins. Examples of a hydrogenated C5 tackifier are EASTOTAC® H-100R (or W) or H-130R(or W) [Eastman Chemical Co., Kingsport, Tenn. 37660]. Mostly preferred for this blend is H-130R (or W) where the number 130 denotes the Ring & Ball Softening Point and for such applications where high thermal stability properties are needed, the higher R&B SP tackifiers such as H-130 are most preferred. Yet other components may be liquid plasticizers such as mineral or naphthenic oils. They may also be polyethylene, Fischer-Tropsch, and paraffinic waxes. Also, components such as anti-oxidants and UV stabilizers may be added as co-adjuvants.

It is contemplated that the combination of longer chains and the higher degree of crystallinity of the low MW iPP, leads to the formation in the solid state of some highly crystallized networks which may be presumed to add improved mechanical strength over the unformulated APAOs. In addition, the presence of small amounts of grafted maleic anhydride (the functionalization) in the low-MW iPP may be presumed to improve the adhesion to more polar substrates such as metallic or functionalized polymeric surfaces.

APAO hot melt adhesives according to the invention may be prepared or manufactured by any of the known manufacturing processes commonly used throughout the HMA industry, such as with low shear-rate, double planetary mixers, high shear-rate, Sigma-blade mixers, turbine mixers, etc. These are known in the industry as "batch mixers." Typical blending or residence times in batch mixers may vary anywhere from 30 minutes up to about 4 hours although preferable mixing times may be between one hour and three hours and most preferably between one and two hours. The mixing time will also be determined by the mixing temperature. The higher the temperature, the shorter the mixing times.

Other blending/mixing equipment such as single-screw and double-screw extruders, or static mixers, which are known as "dynamic" or "continuous" mixers, may also be used. For the versed in the art, any mixer that effectively blends the components of the subject HMA may be used.

If using a batch mixer, it is recommended that the mixing temperature be at least 150° C. (or about 300° F.), although higher temperatures of up to about 205° C. (400° F.) may be used, but are not recommended due to the deleterious effect of very high temperatures on the polymers' stability. With a dynamic mixer, due to the much shorter residence times in the mixing cavity, higher temperatures may be used. It is highly recommended that the mixing be carried in an inert atmosphere, such as under dry nitrogen.

The order of the mixing of the components, may not be important. However, in the case of a batch mixer, it is preferred that at least 50 to 100% of the major component of the blend, the APAO (or APAOs if more than one is used), be added first to the mixing vessel. Next, the prescribed amount of thermal stabilizers may be added. It is preferred that the APAO be allowed to melt or soften before the mixing is initiated. Once the APAO is thoroughly and completely molten, the low MW iPP polymer may be added and vigorous stirring/mixing carried out until a visual analysis/inspection of the melt denotes the absence of gels, and the appearance is that of a smooth, free flowing melt. The low-MW functionalized iPPs are particularly quick in melting and forming a homogeneous melt with the APAO. The time to achieve the complete melting or dissolution of the low MW iPP depends on both the melt temperature and also whether one uses a low or a high shear mixing vessel.

After the low MW functionalized iPP has been mixed with the APAO, the next component added may be the tackifier(s) and any liquid plasticizers, if used, are also added. Mixing may be continued until a homogeneous blend is achieved. The contents are then carefully transferred to a container such as a siliconized carton, known generally as a Menasha box, or any other container that allows the quick removal of the solidified block or brick.

Mixing the components in an extruder is typically much faster, with residence times of a few minutes, instead of hours. Mixing is also quite efficient and the ribbon of molten product may be harvested in any of the known forms, which are known to the versed in the art.

Some representative examples follow:

EXAMPLE 1

Thirty six hundred (3600) grams of solid REXTAC® RT2814, a high 1-butene/propylene copolymer APAO [Rextac LLC, Odessa, Tex. 79760], were charged in a Charles Ross & Son Co. (Ross) double-planetary mixer heated to about 375° F. (190° C.). The lid of the mixer was lowered and a stream of dry nitrogen was initiated to achieve an inert atmosphere in the mixer. The copolymer was allowed to melt for about 30 minutes and then about 3000 ppm of a binary blend of a hindered phenol type antioxidant, and a phosphite stabilizer were added, followed by 400 grs of Polybond® 3200, a maleated iPP with a MV of about 85,000 cps. The two components were thoroughly mixed and after about three hours, the homogeneous blend was harvested and collected in the aforementioned Menasha boxes. The Brookfield melt viscosity measured at 375° F. was about 2300 cps. Additional properties are shown in Table 1.

EXAMPLE 2

Thirty four hundred (3400) grams of solid REXTAC RT2730, a 1-butene/propylene copolymer APAO, were charged in a Charles Ross & Son Co. (Ross) double-planetary mixer heated to about 375° F. (190° C.). The lid of the mixer was lowered and a stream of dry nitrogen was initiated to achieve an inert atmosphere in the mixer. The copolymer was allowed to melt for about 30 minutes and then about 3000 ppm of a binary blend of a hindered phenol type antioxidant, and a phosphite stabilizer were added, followed by 600 grs of Polybond® 3200, a maleated iPP with a MV of about 85,000 cps. The two components were thoroughly mixed and after about three hours, the homogeneous blend was harvested and collected in the aforementioned Menasha boxes. The Brookfield melt viscosity measured at 375° F. was about 4050 cps. Additional properties are shown in Table 1.

EXAMPLE 3

Thirty four hundred (3400) grams of solid REXTAC RT2280, a low ethylene/propylene copolymer APAO, were charged in a Charles Ross & Son Co. (Ross) double-planetary mixer heated to about 375° F. (190° C.). The lid of the mixer was lowered and a stream of dry nitrogen was initiated to achieve an inert atmosphere in the mixer. The copolymer was allowed to melt for about 30 minutes and then about 3000 ppm of a binary blend of a hindered phenol type antioxidant, and a phosphite stabilizer were added, followed by 600 grs of Polybond® 3200, a maleated iPP with a MV of about 85,000 cps. The two components were thoroughly mixed and after about three hours, the homogeneous blend was harvested and collected in the aforementioned Menasha boxes. The Brookfield melt viscosity measured at 375° F. was about 13,000 cps. Additional properties are shown in Table 1.

EXAMPLE 4

Thirty two hundred (3200) grams of solid REXTAC RT2280, a low ethylene/propylene copolymer APAO, were charged in a Charles Ross & Son Co. (Ross) double-planetary mixer heated to about 375° F. (190° C.). The lid of the mixer was lowered and a stream of dry nitrogen was initiated to achieve an inert atmosphere in the mixer. The copolymer was allowed to melt for about 30 minutes and then about 3000 ppm of a binary blend of a hindered phenol type antioxidant, and a phosphite stabilizer were added, followed by 400 grs of Polybond® 3000, a maleated iPP with a MV of about 20,000 cps. The two components were thoroughly mixed and after about one hour, 200 grs of a hydrogenated C5 tackifier, such as for example Eastotac® H-130W, were added. Mixing was continued for another one hour and the homogeneous blend was harvested and collected in the aforementioned Menasha boxes. The Brookfield melt viscosity measured at 375° F. was about 8,000 cps. Additional properties are shown in Table 1.

TABLE 1

| | Example 1 | Example 2 | Example 3 | Example 4 | RT2814 | RT2730 | RT2280 |
|---|---|---|---|---|---|---|---|
| Ingredients | | | | | | | |
| RT2814 | 90% | — | — | — | 100 | — | — |
| RT2730 | — | 85% | — | — | — | 100 | — |
| RT2280 | — | — | 90% | 80% | — | — | 100 |
| PB3000 | — | — | — | 10% | — | — | — |
| PB3200 | 10% | 15% | 10% | — | — | — | — |
| H-130W | — | — | — | 10% | — | — | — |
| Properties | | | | | | | |
| MV, cps | 2300 | 4050 | 13,000 | 8,000 | 1300 | 2850 | 8250 |
| RBSP, F. | 315 | 322 | 317 | 310 | 190 | 230 | 300 |
| NP, dmm | 17 | 12 | 9 | 10 | 25 | 32 | 14 |
| Stress @ Max Load, psi | 120 +/− 5 | 165 +/− 15 | 325 +/− 20 | 340 +/− 15 | 80 +/− 5 | 60 +/− 5 | 180 +/− 10 |

The addition of the functionalized iPP to the APAO in quantities of less than 15 wt. %, preferably of 10 wt. % or less, results in a blended product that shows a significant improvement in not only mechanical properties such as tensile stress, but also in the heat resistance reflected by the increase in the RBSP of at least 10° F., example 4, and up to as much as 125° F., example 1.

In addition, it may also be observed that the addition of the functionalized iPP results in a blended product that exhibits enhanced bonding characteristics to polar substrates such as Aluminum and Mylar. This is evident in Table 2 where for example the addition of 10 wt. % of PB3200 to RT2814 increases the Aluminum-to-Aluminum T-peel values, maximum peel @ load, from about 2.4+/−0.2 lbf to about 9+/−2 lbf. Or the addition of 10 wt. % of PB3200 to RT2730 results in an almost tripling of the Mylar-to-Mylar T-peel values. Similar improvements are observed in other blends of APAO with the functionalized iPP, as seen in Table 2. This may be expected to be the case in general not only for the examples shown in Table 2, but also for any other APAO.

TABLE 2

| Sample label | Example 1 | Example 2 | Example 3 | Example 4 | RT2814 | RT2730 | RT2280 | Substrates |
|---|---|---|---|---|---|---|---|---|
| Maximum Peel Load, lbf | 9 ± 2 | 15.7 ± 1.3 | 9.8 ± 3.1 | 15 ± 4 | 2.4 ± 0.2 | 7 ± 2 | 1.6 ± 0.4 | Aluminum-to-Aluminum |
| Peel Str, lbf/in | 3.3 ± 2.3 | 4.1 ± 1.7 | 2.3 ± 0.6 | 3.4 ± 1 | 1.7 ± 0.3 | 5 ± 2 | 1.4 ± 0.1 | Aluminum-to-Aluminum |
| Maximum Peel Load, lbf | 8.6 ± 1.1 | 8.1 ± 1.7 | 4.0 ± 2.6 | 4.7 ± 2.1 | 2.8 ± 0.3 | 2.7 ± 0.6 | 1.1 ± 0.5 | Mylar-to-Mylar |
| Peel Str, lbf/in | 5.3 ± 0.8 | 4.5 ± 0.4 | 0.6 | 0.7 | 2.4 ± 0.3 | 2.3 ± 0.4 | 0.2 ± 0.1 | Mylar-to-Mylar |

Physical and Mechanical Testing Methods

Melt Viscosity (MV), was determined at 375° F. (190° C.), as per the ASTM D-3236 or DIN 53019 test methods, using a BROOKFIELD® Melt Viscometer Model DV-I Prime [Brookfield Engineering Laboratories, Inc., Middleboro, Mass. 02356].

Needle Penetration (NP) was determined as per ASTM D-1321, ASTM D5 or DIN EN 1426 test methods, using a HUMBOLDT® H-1240D Needle Penetrometer [Humboldt Wedag GmbH, Köln, Germany].

Ring and Ball Softening Point (RBSP) was determined as per ASTM E-28 or DIN EN 1427 test methods, using a HERZOG® HRB 754 instrument [Walter Herzog GmbH, Lauda-Konigshofen, Germany].

Tensile Strength (TS) was measured following the testing protocols described in ASTM D-638, D-412 or DIN EN ISO 527-3 test methods, using an INSTRON® 4464 tensile tester [Instron Engineering Corp., Quincy, Mass].

Aluminum-to-Aluminum and Mylar-to-Mylar T-Peels were measured on 1-inch wide laminated strips following the testing protocol described in ASTM D-638 test method using an Instron 4464 tensile tester.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A hot-melt adhesive comprising:
    at least one propylene-butene-1 (APB) amorphous poly alpha olefin (APAO) copolymer;
    at least one low molecular weight (MW), functionalized, isotactic polypropylene (iPP); and
    a propylene-ethylene (APE) amorphous poly alpha olefin (APAO) copolymer.

2. The hot-melt adhesive recited in claim 1 further comprising:
    a tackifier.

3. The hot-melt adhesive recited in claim 1 further comprising:
    a plasticizer.

4. The hot-melt adhesive recited in claim 1 wherein the isotactic polypropylene (iPP) is a maleated iPP.

* * * * *